(12) United States Patent
Domon et al.

(10) Patent No.: US 12,209,321 B2
(45) Date of Patent: Jan. 28, 2025

(54) METHOD AND DEVICE FOR MANUFACTURING SODIUM HYPOCHLORITE SOLUTION

(71) Applicant: DE NORA PERMELEC LTD, Fujisawa (JP)

(72) Inventors: Hiroki Domon, Fujisawa (JP);
Masahiro Ohara, Fujisawa (JP);
Masaaki Kato, Fujisawa (JP)

(73) Assignee: DE NORA PERMELEC LTD, Fujisawa (JP)

( * ) Notice: Subject to any disclaimer, the term of this patent is extended or adjusted under 35 U.S.C. 154(b) by 93 days.

(21) Appl. No.: 18/288,757

(22) PCT Filed: Mar. 16, 2022

(86) PCT No.: PCT/JP2022/012033
§ 371 (c)(1),
(2) Date: Oct. 27, 2023

(87) PCT Pub. No.: WO2022/230422
PCT Pub. Date: Nov. 3, 2022

(65) Prior Publication Data
US 2024/0218542 A1 Jul. 4, 2024

(30) Foreign Application Priority Data
Apr. 30, 2021 (JP) ................. 2021-077761

(51) Int. Cl.
*C25B 15/08* (2006.01)
*C01B 11/06* (2006.01)
(Continued)

(52) U.S. Cl.
CPC .......... *C25B 15/081* (2021.01); *C01B 11/062* (2013.01); *C02F 1/42* (2013.01);
(Continued)

(58) Field of Classification Search
None
See application file for complete search history.

(56) References Cited

U.S. PATENT DOCUMENTS 8,268,159 B2 * 9/2012 Balagopal ................. C25B 1/26
205/621
2007/0251831 A1 * 11/2007 Kaczur .................. C25B 15/02
204/266

FOREIGN PATENT DOCUMENTS

| CN | 103796958 A | 5/2014 |
| CN | 107604377 A | 1/2018 |

(Continued)

OTHER PUBLICATIONS

Machine Translation of WO-2013065797 (Year: 2013).*
(Continued)

*Primary Examiner* — Michael Forrest
(74) *Attorney, Agent, or Firm* — Birch, Stewart, Kolasch & Birch, LLP

(57) ABSTRACT

To provide a method and an apparatus for producing a sodium hypochlorite solution on-site at a high efficiency and at the initial cost and suppressing operating cost without any problems about impurities derived from raw material water and raw salt. A method of producing a sodium hypochlorite solution on-site in the vicinity of a physical plant where a sodium hypochlorite solution is used. In production of a sodium hypochlorite solution by feeding secondary salt water, in an electrolyzer comparted into an anode chamber and a cathode chamber with an ion-exchange membrane, to the anode chamber and allowing components in the anode chamber and the cathode chamber after electrolysis to react in a reaction tank, there are included respective steps of treating raw material water A with a cation-exchange resin B to generate purified water 5, dissolving raw salt D in the purified water to generate primary salt water E, performing
(Continued)

an examination for confirming the presence or absence of a precipitate or suspended solid in the primary salt water, and directly performing chelating in the case of no precipitate or suspended solid contained in the primary salt water, or performing chelating after addition of an acid component for dissolution of the precipitate or suspended solid in the case of the precipitate or suspended solid contained therein, to generate secondary salt water 4.

12 Claims, 1 Drawing Sheet

(51) Int. Cl.
*C02F 1/42* (2023.01)
*C02F 1/68* (2023.01)
*C25B 1/46* (2006.01)
*C25B 9/19* (2021.01)

(52) U.S. Cl.
CPC ............... *C02F 1/683* (2013.01); *C25B 1/46* (2013.01); *C25B 9/19* (2021.01); *C25B 15/085* (2021.01); *C02F 2001/425* (2013.01)

(56) References Cited

FOREIGN PATENT DOCUMENTS

| | | |
|---|---|---|
| CN | 108950590 A | 12/2018 |
| CN | 112281180 A | 1/2021 |
| JP | 59-190215 A | 10/1984 |
| JP | 5-179475 A | 7/1993 |
| JP | 5-186215 A | 7/1993 |
| JP | 6-10177 A | 1/1994 |
| JP | 7-31979 A | 2/1995 |
| JP | 2013-96001 A | 5/2013 |
| WO | WO-2013065797 A1 * 5/2013 ........... C01B 11/062 |

OTHER PUBLICATIONS

International Search Report for PCT/JP2022/012033 mailed on May 31, 2022.
Written Opinion of the International Searching Authority for PCT/JP2022/012033 mailed on May 31, 2022.

* cited by examiner

METHOD AND DEVICE FOR MANUFACTURING SODIUM HYPOCHLORITE SOLUTION

TECHNICAL FIELD

The present invention relates to a production method of a sodium hypochlorite solution and a production apparatus of a sodium hypochlorite solution (hereinafter, also simply referred to as "production method" and "production apparatus"). The present invention specifically relates to a technique for suppressing degradation of an ion-exchange membrane due to metal contamination in a method and an apparatus that each produce a high-concentration sodium hypochlorite solution on-site by using an ion-exchange membrane for a diaphragm of an electrolyzer and mixing an electrolysis product except for hydrogen, generated in the electrolyzer, in a reaction tank.

BACKGROUND ART

Sodium hypochlorite is utilized as a typical bleaching agent or disinfecting agent in various circles such as treatment of water and sewer and treatment of drainage water. Methods for producing sodium hypochlorite are commonly a method of production by reaction of chlorine obtained by electrolysis of common salt water, with an aqueous sodium hydroxide solution, in a reaction tank, and a method of directly producing sodium hypochlorite in a non-diaphragm electrolyzer by electrolysis of an aqueous sodium chloride solution in a non-diaphragm electrolyzer.

In the latter method, it is difficult to obtain a high-concentration sodium hypochlorite solution because the electrolyzer has no diaphragm and thus sodium hypochlorite generated is reduced to common salt on a cathode and the sodium hypochlorite generated is anodized and converted into sodium chlorate having no effective oxidation power. Therefore, applications of sodium hypochlorite with this production method are commonly those in which no high concentration is required, such as heat exchange water in a power generating plant, shaft cooling water in a rotary equipment, and prevention of growth/attachment of living organisms in sea water in ballast water treatment, as well as water and sewage treatment, and wastewater treatment.

On the other hand, an application to which the former production method is applied is representatively a common production method of high-concentration sodium hypochlorite in a salt electrolysis plant. A salt electrolysis plant necessarily includes a salt water purification system for highly removing metallic impurities and unnecessary anions contained in raw material salt and raw material water in order to maintain a stable and high-efficiency plant operation, and a system for re-purification by decomposing and removing hypochlorous acid and chloric acid contained in salt water after electrolysis in order to recycle common salt water decreased in concentration after electrolysis, and facilities are increased in scale.

A main object of a salt electrolysis plant is not to produce sodium hypochlorite, but to produce sodium hydroxide and chlorine gas which have many industrial applications, and such a plant is often a plant included in a petrochemical complex and is often a large-scale plant producing tens of thousands to hundreds of thousands of tons a year in terms of sodium hydroxide. The number of salt electrolysis plants is predominantly small as compared with the number of water treatment plants and the like requiring high-concentration hypochlorite, and thus there arise a need for transporting chlorine gas or hypochlorite necessary for sterilization of clean water to a water treatment plant and storing it in the plant. Therefore, elements of danger, such as human-caused disasters and environmental destruction due to liquid leakage or the like from a storage facility, are always possessed. In particular, a traffic accident by a tank lorry for use in transportation of chlorine gas causes a serious accident where chlorine gas is scattered to the environment, to occur in countries, and the movement to tighten the law on transportation of chlorine gas is activated.

In such circumstances, an on-site-type production method of high-concentration hypochlorite is proposed, in which a small electrolytic apparatus for production of sodium hypochlorite is disposed in a physical plant utilizing sodium hypochlorite such as a water treatment plant, and a required amount of sodium hypochlorite is produced when needed.

For example, Patent Document 1 proposes production of high-concentration hypochlorite by electrolyzing, in an ion-exchange membrane electrolyzer comparted into an anode chamber and a cathode chamber with an ion-exchange membrane, an aqueous alkali metal chloride solution in the anode chamber and introducing the aqueous alkali metal chloride solution decreased in concentration due to electrolysis into the cathode chamber to retain a constant concentration of alkali metal hydroxide in the cathode chamber and also introducing this catholyte together with chlorine generated in the anode chamber into a reaction tank provided outside of the electrolyzer.

Patent Document 2 describes a technique in which, in production of hypochlorite by performing electrolysis with feeding of an aqueous alkali metal chloride solution, in an electrolyzer comparted into an anode chamber and a cathode chamber with an ion-exchange membrane, to the anode chamber and feeding of pure water to the cathode chamber, and by introducing an anolyte and chlorine gas generated in the anode chamber and a produced aqueous alkali metal hydroxide solution in the cathode chamber, after the electrolysis, into a reaction tank, an ion-exchange membrane for generation of high-concentration caustic alkali for electrolysis of common salt or potassium chloride is used as the ion-exchange membrane, and also water is added to the anolyte or aqueous alkali metal hydroxide solution before introduction into the reaction tank, or to a mixture of the anolyte, chlorine gas and aqueous alkali metal hydroxide solution after introduction into the reaction tank.

RELATED ART DOCUMENTS

Patent Documents

[Patent Document 1] JPH05-179475A
[Patent Document 2] JP2013-096001A

SUMMARY OF THE INVENTION

Problems to be Solved by the Invention

Both the methods described in Patent Documents 1 and 2 achieve elimination of a removal step of chlorine dissolved and hypochlorous acid which are contained in common salt water decreased in concentration after electrolysis, the step being essential in production of hypochlorite in a salt electrolysis plant, and can allow for simplification of a system necessary for an on-site production facility. In particular, the method described in Patent Document 2 achieves improvement for production of high-concentration sodium hypochlorite, by water addition and use of a bilayer membrane including a carboxylic acid layer, in the electrolyzer, in order to prevent alkali salt deposition in the reaction tank.

Although on-site production of high-concentration hypochlorite is thus possible by a simple facility in a place where hypochlorite is utilized by a user, according to the techniques described in Patent Documents 1 and 2, a problem to be solved still remains.

In other words, Patent Document 2 utilizes a bilayer membrane capable of realizing a high current efficiency in the electrolyzer in order to generate high-concentration hypochlorite. This bilayer membrane is an ion-exchange membrane developed for the purpose of production of chlorine and sodium hydroxide at a high efficiency in a salt electrolysis plant, and has a structure in which a sulfonic acid layer including a sulfonic acid group as an ion-exchange group, and a carboxylic acid layer including a carboxylic acid group are bonded to each other. The carboxylic acid layer, which is placed towards the cathode chamber, has a function of suppressing a diffusion phenomenon of high-concentration sodium hydroxide from the cathode chamber to the anode chamber, as a main cause of a low current efficiency, and is a member necessary for realization of a high current efficiency.

However, when the concentration of metallic impurities contained in salt water, in particular, the concentration of calcium ions and magnesium ions is high, the bilayer membrane is prone to the deposition of a hardly soluble substance and clogging of an ion-exchange group in the interior of the membrane and on a surface of the membrane facing the cathode, and, if frequently caused, lead to the occurrence of peeling of the bilayer membrane, resulting in a reduction in current efficiency and an increase in membrane resistance, and then deterioration in performance of an electrolyzer being an important component of a sodium hypochlorite production apparatus.

As described above, while the salt electrolysis plant necessarily includes an advanced salt water purification system for removing metallic impurities and a system for recovering the salt water concentration by decomposition and removal of hypochlorous acid and chloric acid contained in salt water after electrolysis for recycle of common salt water decreased in concentration after electrolysis, and facilities are increased in scale and also a chemical substance consumed and the number of management man-hours in an apparatus operation are increased, this salt water purification system is an essential facility in order to suppress degradation of the bilayer membrane and stably operate the salt electrolysis plant at a high efficiency for a long period.

However, Patent Document 2 relates to an on-site-type production method of hypochlorite, simply configured, and Patent Document 2 does not particularly describe any solution for removal of metallic impurities for the purpose of protection of such a bilayer membrane. In this regard, an on-site-type hypochlorite production apparatus, when utilizes an ion-exchange membrane, in particular, a bilayer membrane in a diaphragm, also allows for no high-efficiency operating of an electrolyzer, if no removal of calcium ions and magnesium ions contained in raw material water and raw salt is at least performed, and frequent stopping and maintenance are caused as in the case of the salt electrolysis plant. Herein, a high-concentration hypochlorite production apparatus operated on-site is largely advantageous when facilities thereof are simple, and thus a large-scale system like a salt water purification mechanism of a salt electrolytic system is desirably avoided from being placed.

In the case of an on-site-type sodium hypochlorite production apparatus, the location and environment for placement are various and thus qualities of raw material water and raw salt as raw materials of salt water are also not sufficiently managed, and one containing a large amount of impurities is always fed to the apparatus.

Accordingly, an object of the present application is to provide a production method and a production apparatus of a sodium hypochlorite solution for the purposes of solving the problem about impurities brought from such raw material water and raw salt and of producing a sodium hypochlorite solution on-site at a high efficiency and at the initial cost and operating cost suppressed.

Means for Solving the Problems

The present inventors have made intensive studies, and as a result have found that the above problems can be solved by improving a process for producing salt water to be fed to an electrolyzer, leading to completion of the present invention.

In other words, the production method of a sodium hypochlorite solution of the present invention is a method of producing a sodium hypochlorite solution on-site in the vicinity of a physical plant where a sodium hypochlorite solution is used, including: in production of a sodium hypochlorite solution by feeding secondary salt water as an aqueous sodium chloride solution, in an electrolyzer comparted into an anode chamber and a cathode chamber with an ion-exchange membrane, to the anode chamber and, after electrolysis, introducing an anolyte and generated chlorine gas in the anode chamber and an aqueous sodium hydroxide solution generated in the cathode chamber into a reaction tank to allow the anolyte, the chlorine gas, and the generated aqueous sodium hydroxide solution, as a catholyte, to react in the reaction tank, a cation exchange step of generating purified water by treating raw material water with a cation-exchange resin;
  a primary salt water generation step of to generating primary salt water by dissolving raw salt containing sodium chloride as a main component in the purified water;
  an examination step of performing an examination for confirming the presence or absence of a precipitate or suspended solid in the primary salt water; and
  a chelating step of performing chelating in the case of no precipitate or suspended solid contained in the primary salt water, or performing chelating after addition of an acid component for dissolution of the precipitate or suspended solid in the case of the precipitate or suspended solid contained in the primary salt water, to generate the secondary salt water.

In the production method of the present invention, a water softener can be used in the cation exchange step. In addition, in the production method of the present invention, a bilayer membrane configured from a sulfonic acid layer and a carboxylic acid layer is preferably used as the ion-exchange membrane.

Moreover, in the production method of the present invention, hydrochloric acid is preferably used as the acid component and air containing carbon dioxide is also preferably used as the acid component, in the chelating step.

Furthermore, in the production method of the present invention, one having a hardness of 10 to 500 mg/l can be used as the raw material water. Furthermore, in the production method of the present invention, any of visual observation, a laser light scattering method and SS concentration measurement is preferably used as an examination means in the examination step.

The production apparatus of a sodium hypochlorite solution of the present invention is an apparatus including an electrolyzer comparted into an anode chamber and a cathode chamber with an ion-exchange membrane, to which secondary salt water as an aqueous sodium chloride solution is to be fed, and a reaction tank into which products in the anode chamber and the cathode chamber after electrolysis are to be introduced, the apparatus being disposed in the vicinity of a physical plant where a sodium hypochlorite solution is used, and producing a sodium hypochlorite solution on-site by reaction in the reaction tank, characterized in that the apparatus includes a salt water production unit including:

a cation exchange treatment section for providing purified water by treating raw material water with a cation-exchange resin;

a primary salt water generation section for generating primary salt water by dissolving raw salt containing sodium chloride as a main component in the purified water; and a chelating section for performing chelating of the primary salt water.

In the production apparatus of the present invention, an examination section for performing an examination to confirm the presence or absence of a precipitate or suspended solid in the primary salt water may be provided between the primary salt water generation section and the chelating section. In this case, the examination section may include a laser light scattering measurement apparatus or a SS concentration measurement apparatus.

In addition, in the production apparatus of the present invention, an addition section for adding an acid component to the primary salt water is preferably provided between the primary salt water generation section and the chelating section.

Moreover, in the production apparatus of the present invention, the cation exchange treatment section can include a water softener. Furthermore, in the production apparatus of the present invention, the ion-exchange membrane is preferably a bilayer membrane configured from a sulfonic acid layer and a carboxylic acid layer.

Effects of the Invention

According to the present invention, it is possible to provide a production method and a production apparatus of a sodium hypochlorite solution for the purposes of solving the problem about impurities brought from raw material water and raw salt and of producing a sodium hypochlorite solution on-site at a high efficiency and at the initial cost and operating cost suppressed.

MODE FOR CARRYING OUT THE INVENTION

Hereinafter, embodiments of the present invention will be described with reference to the drawings, but the present invention is not intended to be limited thereto.

The present invention relates to improvements of a method and an apparatus that each produce a sodium hypochlorite solution on-site in the vicinity of a physical plant where a sodium hypochlorite solution is used. In the present invention, a high-concentration sodium hypochlorite solution is produced by feeding secondary salt water as an aqueous sodium chloride solution, in an electrolyzer comparted into an anode chamber and a cathode chamber with an ion-exchange membrane, to the anode chamber and introducing an anolyte and chlorine gas generated, in the anode chamber, and an aqueous sodium hydroxide solution generated, in the cathode chamber, after electrolysis, into a reaction tank, to allow the anolyte, the chlorine gas, and the aqueous sodium hydroxide solution generated, as a catholyte, to react in the reaction tank.

Figure 1:
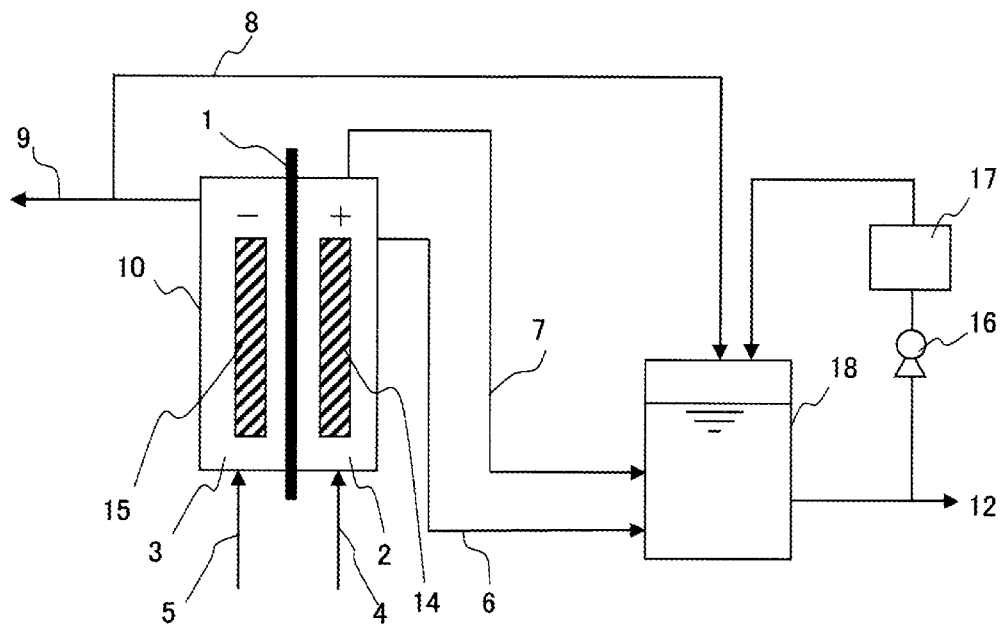
FIG. 1 An apparatus configuration diagram illustrating a main section of one example of the production apparatus of a sodium hypochlorite solution of the present invention.

FIG. 1 illustrates an apparatus configuration diagram of a main section of one example of the production apparatus of a sodium hypochlorite solution of the present invention. A production apparatus illustrated includes an electrolyzer 10 comparted into an anode chamber 2 and a cathode chamber 3 with an ion-exchange membrane 1, to which secondary salt water as an aqueous sodium chloride solution 4 is to be fed, and a reaction tank 18 into which products in the anode chamber 2 and the cathode chamber 3 after electrolysis are to be introduced, and is disposed in the vicinity of a physical plant where a sodium hypochlorite solution is used and produces a high-concentration sodium hypochlorite solution 12 on-site by a reaction in the reaction tank 18.

The present invention is characterized by undergoing the following series of steps in production of secondary salt water as an aqueous sodium chloride solution to be fed to the anode chamber, from raw material water. Such series of steps are used to thereby generate secondary salt water from which calcium and magnesium are removed, and therefore, degradation of an ion-exchange membrane can be suppressed without any need for large-scale facilities such as a pure water production apparatus and a filtration tank, and a sodium hypochlorite solution can be stably produced on-site for a long period at a high efficiency and at the initial cost and operating cost suppressed.

Figure 2:
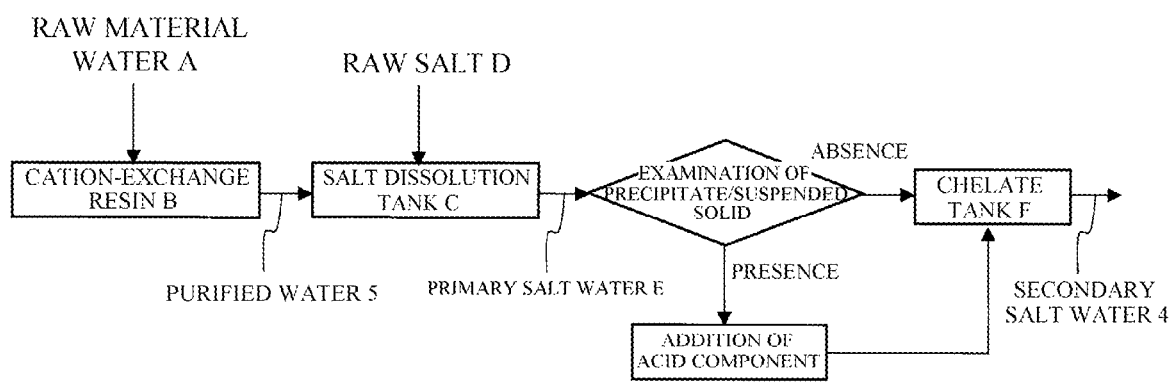
FIG. 2 An explanatory diagram illustrating a flowchart of the production process of secondary salt water according to the present invention.

FIG. 2 illustrates an explanatory diagram of a flow of the production process of secondary salt water according to the present invention. In the present invention, for example, a salt water production unit that produces secondary salt water from raw material water can be provided in parallel with a main section of the production apparatus of a sodium hypochlorite solution as illustrated in FIG. 1, to thereby provide a compact production plant usable on-site. Specifically, the salt water production unit in the present invention includes a cation exchange treatment section that treats raw material water A with a cation-exchange resin B to provide purified water 5, a primary salt water generation section that dissolves raw salt D containing sodium chloride as a main component, in the purified water 5 obtained, to generate primary salt water E, and a chelating section that performs chelating of the primary salt water E, in a basic configuration.

More specifically, when secondary salt water 4 is produced from raw material water A in the present invention, the raw material water A is treated with a cation-exchange resin B to generate purified water 5 (cation exchange step), raw salt D containing sodium chloride as a main component is dissolved in the purified water 5 to generate primary salt water E (primary salt water generation step), an examination for confirming the presence or absence of a precipitate or suspended solid in the primary salt water E is performed (examination step), and thereafter chelating is directly performed in the case of no precipitate or suspended solid contained in the primary salt water E, or chelating is performed after addition of an acid component for dissolution of the precipitate or suspended solid in the case of the precipitate or suspended solid contained in the primary salt water E, to generate secondary salt water 4 (chelating step). Thereafter, the secondary salt water 4 generated is fed to the anode chamber 2 of the electrolyzer 10 and subjected to production of sodium hypochlorite.

Hereinafter, each of the above steps will be described in detail.

[Cation Exchange Step]

As described above, in the present invention, raw material water A is first treated with a cation-exchange resin B, to generate purified water 5. This step can obtain purified water 5 as soft water lower in hardness than the raw material water A by adsorption and removal of calcium ions, magnesium ions and other heavy metal ions contained in the raw material water A and exchange of these ions with sodium ions or hydrogen ions. Herein, counter ions of metal ions in the raw material water A are mainly hydrogen carbonate ions or chloride ions, and these ions are not removed and remain in the purified water 5.

The raw material water A for use in the present invention can be tap water, well water (groundwater), industrial water or the like available in an on-site production place in the vicinity of a physical plant where a sodium hypochlorite solution is used. Such water often contains calcium ions and magnesium ions in the form of hydrogen carbonate and an approximate concentration of such ions can be found in terms of hardness, and even tap water that is commonly said in Japan to be soft water often contains calcium and magnesium in an amount of about several tens mg/l and hard water may also contain them in an amount of more than 100 mg/l. The raw material water A for use in the present invention can be specifically, for example, one having a hardness of 10 to 500 mg/l, and is preferably one having a hardness of 10 to 300 mg/l.

On the other hand, metal ions in the secondary salt water to be fed to the electrolyzer are required to be commonly at 1.3 mg/l or less in order to use the ion-exchange membrane for use in the electrolyzer at stable performance for a long period, and are required to be at 0.1 mg/l or less in the case of use of a bilayer membrane. In this regard, the hardness of the purified water 5 after the cation exchange step in the present invention is preferably 0 to 3.3 mg/l, more preferably 0 to 0.3 mg/l.

The cation-exchange resin B for use in the cation exchange step is not particularly limited, may be of Na-type or H-type, and, in the present invention, is preferably of Na-type that enables the amount of alkali added for pH adjustment to be reduced, because the pH of the primary salt water E is required to range from weak acidity to neutrality in a chelating step described below.

In addition, in the present invention, the cation exchange treatment section used for performing the cation exchange step can be a water softener using the cation-exchange resin, rather than the cation-exchange resin by itself. If the cation-exchange resin is degraded, regeneration may be made by a method involving exchanging the cation-exchange resin degraded, with a new cation-exchange resin, or by a method of regeneration with a regeneration mechanism attached to the water softener, and salt in the case of use of the water softener. In general, exchange of calcium ions and magnesium ions with sodium ions by use of the water softener leads to an increase in pH.

[Primary Salt Water Generation Step]

In the present invention, raw salt D containing sodium chloride as a main component is then dissolved in the purified water 5 obtained, to generate primary salt water E as saturated salt water at room temperature. The dissolution of the raw salt D in the purified water 5 can be performed in a salt dissolution tank C.

Any of solar salt and rock salt may be used as raw salt D. It is more preferable to perform further purification with the raw salt as a raw material and then use purified salt from which metallic impurities such as calcium ions and magnesium ions are removed to some extent. Even such purified salt may also newly take impurities from the environment due to rainfall or the like, depending on the storage state, and thus removal treatment of impurities in the present invention is essential.

The purified water 5 treated with the cation-exchange resin here contains sodium ions and hydrogen ions as cations, and also contains hydrogen carbonate ions, chloride ions, and the like originally contained as anions in the raw material water. The raw salt D contains, in addition to sodium chloride, mainly chlorides of calcium and magnesium, and such chlorides are dissolved as calcium ions and magnesium ions. These are required to be removed from the viewpoint of performance protection of a bilayer membrane, and a simple method is required to be adopted because an on-site-type is adopted.

Not only chloride ions, but also hydrogen carbonate ions brought from the raw material water A co-exist as counter ions of calcium ions and magnesium ions in the primary salt water E. Since hydrogen carbonate ions have the properties of dissolving large amounts of calcium ions and magnesium ions, these cations are removed by a chelate agent, if can be fed in the form of being dissolved as calcium hydrogen carbonate and magnesium hydrogen carbonate in the primary salt water E, to a chelating step described below.

However, in the case where the pH of the raw material water A and the pH of the primary salt water E immediately after dissolution of the raw salt D range from weak alkaline to alkaline, calcium hydrogen carbonate and magnesium hydrogen carbonate dissolved in a liquid are respectively converted to hardly soluble calcium carbonate and magnesium carbonate due to chemical equilibrium, and are possibly deposited as precipitates. Calcium carbonate and magnesium carbonate as precipitates are not removed by a chelate agent and are fed still as precipitates to the electrolyzer. In general, an electrolytic solution in an anode chamber has weak acidity, and thus these precipitates are re-dissolved and reach, as ions, a bilayer membrane, generating low current efficiency and high cell voltage, to cause deterioration in performance and stopping trouble of a hypochlorous acid production apparatus.

The liquid character of the primary salt water E obtained in dissolution of the raw salt D in the purified water 5 is varied because of being affected by the composition of the raw salt D and various impurities in the raw material water A. The liquid character conditions, for example, the pH causing generation of a carbonate precipitate are changed depending on the concentrations of calcium and magnesium contained in the raw material water A and the concentration of the corresponding hydrogen carbonate ions, the concentrations of calcium and magnesium contained in the raw salt D, a relationship with other component, temperature, and the like. Accordingly, it is necessary for prevention of generation of a carbonate precipitate in generation of the primary salt water E to observe and examine the primary salt water E with respect to each of the raw material water A and the raw salt D and determine the subsequent treatment.

In the present invention, an examination for confirming whether or not a precipitate or suspended solid is contained in the resulting primary salt water E is performed after the primary salt water generation step.

[Examination Step]

The examination means in the examination step is not particularly limited as long as the presence or absence of a precipitate or suspended solid in the primary salt water E can be confirmed. The examination means used can be specifically a procedure such as visual observation, a laser light scattering method, SS (suspended solid or suspended substance) concentration measurement, turbidity measurement, or chromaticity measurement.

The examination step can be actually performed by, for example, providing an examination section that performs an examination for confirming the presence or absence of a precipitate or suspended solid in the primary salt water, between a primary salt water generation section and a chelating section in a production apparatus. This examination section can include, for example, a mechanical examination means such as a laser scattering light measurement apparatus or a SS concentration measurement apparatus. Alternatively, the examination can also be simply performed by visually observing the primary salt water E with, for example, a monitoring window provided in the salt dissolution tank C.

[Chelating Step]

In the present invention, in the case where inclusion of a precipitate or suspended solid in the primary salt water E is confirmed in the examination step, the primary salt water E is chelated after addition of an acid component into the primary salt water E for dissolution of the precipitate or suspended solid, or in the case where inclusion of no precipitate or suspended solid in the primary salt water E is confirmed in the examination step, the chelating is directly performed, and thus secondary salt water 4 is generated. The primary salt water E can be chelated to thereby remove calcium ions and magnesium ions brought from the raw salt D, from the primary salt water E, and thus generate clean secondary salt water 4. The primary salt water E can be chelated in a chelate tank F.

The raw salt D may also cause the primary salt water E to have alkaline due to impurities contained in the salt, and the degree of alkaline differs depending on the raw salt D. In the case where many hydrogen carbonate ions are contained in the raw material water A, a carbonate precipitate is easily generated in dissolution of the raw salt D. Accordingly, it is desirable in such a case that the carbonate precipitate be dissolved by adjustment of the primary salt water E to weak acidity to neutrality prior to the chelating step, and in particular, as described above, a suspended solid and precipitate are dissolved by addition of an acid component for allowing the liquid character of the primary salt water E to be weakly acidic to neutral after the presence of the suspended solid and precipitate in the primary salt water E is confirmed. Accordingly, in the present invention, in the case where the pH of the primary salt water E, measured with a pH meter, is weakly acidic to neutral, the chelating may also be directly performed, or in the case where the pH is alkaline, the chelating may also be performed after the pH of the primary salt water E is adjusted to weak acidity to neutrality by addition of an acid component.

In the present invention, in the case where inclusion of a precipitate or suspended solid in the primary salt water E is confirmed, the acid component to be added to the primary salt water E for dissolution of the precipitate or suspended solid is not particularly limited as long as it can dissolve the precipitate or suspended solid, and is preferably one yielding no impurities. Specifically, for example, hydrochloric acid, in particular, hydrochloric acid low in concentration can be used as such an acid component. Air containing carbon dioxide may also be used as the acid component. It is also effective for dissolving the suspended solid and precipitate to subject the primary salt water E to aeration or air contact and thus dissolve carbon dioxide in air in the primary salt water E and lower the pH to allow the primary salt water E to be weakly acidic. Actual addition of the acid component can be performed by, for example, providing an addition section for addition of the acid component to the primary salt water E between the primary salt water generation section and the chelating section, or between the examination section and the chelating section in the case where the examination section is provided.

In the present invention, the secondary salt water 4 generated by chelating the primary salt water E, if necessary, after dissolution and removal of the suspended solid and precipitate due to a lowered pH by addition of the acid component, to remove calcium ions and magnesium ions contained by adsorption and exchange these ions with sodium ions is fed to the electrolyzer. This makes it possible to suppress degradation of the ion-exchange membrane and stably produce sodium hypochlorite on-site over a long period.

Herein, an exchange reaction of a calcium ion with a sodium ion by the cation-exchange resin is as described in the following formula.

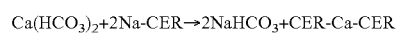

$$Ca(HCO_3)_2 + 2Na\text{-}CER \rightarrow 2NaHCO_3 + CER\text{-}Ca\text{-}CER$$

A reaction for formation of a calcium ion into hydrogen carbonate in dissolution of the raw salt D is as described in the following formula.

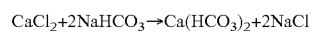

$$CaCl_2 + 2NaHCO_3 \rightarrow Ca(HCO_3)_2 + 2NaCl$$

A reaction for generation of a calcium carbonate precipitate is as described in the following formulae.

$$Ca(HCO_3)_2 \rightarrow CaCO_3 + H_2O + CO_2$$

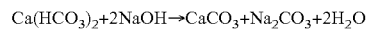

$$Ca(HCO_3)_2 + 2NaOH \rightarrow CaCO_3 + Na_2CO_3 + 2H_2O$$

Next, a production process of a high-concentration sodium hypochlorite solution in the present invention is described. First, electrolysis is performed in an electrolyzer 10 compartmented into an anode chamber 2 and a cathode chamber 3 with an ion-exchange membrane 1 in a production apparatus illustrated in FIG. 1, by feeding secondary salt water 4 generated above, to the anode chamber 2, and also feeding purified water 5 to the cathode chamber 3. Thereafter, an anolyte 6 and chlorine (Cl$_2$) gas 7 generated, in the anode chamber 2, and an aqueous sodium hydroxide solution 8 generated, in the cathode chamber 3, after electrolysis, are introduced into a reaction tank 18, and the anolyte 6, the chlorine gas 7 and the aqueous sodium hydroxide solution 8 in the reaction tank 18 are reacted to produce a sodium hypochlorite solution 12. The anolyte 6 is here salt water lowered in concentration to, for example, a concentration of less than 100 g/L, after electrolysis.

According to the present invention, the above configuration enables high-concentration sodium hypochlorite to be stably and efficiently produced at a low cost in an on-site compact production facility, and enables sodium hypochlorite to be easily produced in a place where sodium hypochlorite is consumed. Therefore, the production method and the production apparatus of the present invention are characterized in that high-concentration sodium hypochlorite conventionally not obtained on-site is stably obtained over a long period.

In the present invention, the ion-exchange membrane 1 used in the electrolyzer 10 may be any one, and a bilayer membrane configured from a sulfonic acid layer and a carboxylic acid layer is preferably used. In the case where a bilayer membrane to be easily degraded by metallic impurities as described above is used as the ion-exchange membrane 1, the present invention is particularly useful.

In the production apparatus for use in the present invention, an anode 14 obtained by forming a cover with an electrode catalyst substance containing an oxide of a platinum-group metal, onto a metal substrate such as titanium, can be provided in the anode chamber 2 of the electrolyzer 10, comparted with the ion-exchange membrane 1. In this regard, a cathode 15 made of nickel, stainless steel or titanium, or obtained by forming a cover with a cathode active substance that not only leads to a reduction in hydrogen overvoltage, but also is excellent in long-term durability, onto such a metal, can be provided in the cathode chamber 3.

Moreover, in the present invention, the secondary salt water 4 as a sodium chloride solution and the purified water 5, while are each controlled in concentration and flow rate depending on an objective amount of sodium hypochlorite generated, can be fed to the electrolyzer 10. The aqueous sodium hydroxide solution 8 and hydrogen gas 9 generated are taken out from the upper portion of the cathode chamber 3, in which the aqueous sodium hydroxide solution 8 is fed to the reaction tank 18 and the hydrogen gas 9 is discharged outside. An anolyte 6 including the salt water lowered in concentration by electrolysis, and the chlorine gas 7 are taken out from the upper portion of the anode chamber 2, and these are each fed to the reaction tank 18.

A sodium hypochlorite solution 12 is generated in the reaction tank 18 by a reaction of chlorine and sodium hydroxide. The sodium hypochlorite solution 12 taken out from the reaction tank 18 can be not only taken out as a product, but also fed to and cooled in a cooling apparatus 17 and thereafter circulated in the reaction tank 18 by a pump 16, and thus not only an increase in temperature of the electrolyzer can be prevented, but also decomposition of sodium hypochlorite generated can be prevented.

In the present invention, a sodium hypochlorite solution having an effective chlorine concentration of 5% to 13% can be produced in a volume of production of 100 kg/day to 3000 kg/day.

EXAMPLES

Hereinafter, the present invention will be more specifically described with reference to Examples.

Sodium hypochlorite was produced using each secondary salt water obtained in Examples and Comparative Examples, in the production apparatus illustrated in FIG. 1. The electrolysis area of the electrolyzer 10 mounted on the sodium hypochlorite production apparatus was 100 cm$^2$, and the current for flowing was 40 A. Nafion (registered trademark) N2030 (a bilayer membrane configured from a sulfonic acid layer and a carboxylic acid layer) manufactured by DuPont, widely used in applications of salt electrolysis, was used as the ion-exchange membrane 1 partitioning the anode chamber 2 and the cathode chamber 3.

Example 1

Tap water having a hardness of 60 mg/l (24 mg/l in terms of Ca), of Tamano-city in Okayama Prefecture, was used as raw material water. The pH of the raw material water was 7.0. This water was penetrated into a cation-exchange resin (Amberlite IR120B manufactured by ORGANO CORPORATION), to obtain purified water. The pH of this purified water was 7.4. Therein was dissolved Nakuru N (manufactured by Naikai Salt Industries Co., Ltd.) as raw salt at 280 g/l, to generate salt water (primary salt water). The pH of this primary salt water was 7.9.

After the primary salt water was left to still stand, the supernatant was collected in a glass beaker and visually observed, and also irradiated with laser light (wavelength: 630 to 680 nm) by use of a laser irradiation apparatus (manufactured by Limate Corporation) for observation of scattering light in a dark room, and thus a light path in a liquid could be slightly seen and it was determined that primary salt water having almost no solid in a liquid was obtained. The turbidity was 0 mg/l and the Ca concentration was 78 mg/l in measurement with an absorbance meter (HACH DR5000 manufactured by DKK-TOA CORPORATION). This primary salt water was chelated (CR-11 Na-type SV4.2h-1 manufactured by Mitsubishi Chemical Corporation), to obtain secondary salt water having no solid in a liquid. This secondary salt water had a turbidity of 0 mg/l and a Ca concentration of 11 μg/l, and was secondary salt water suitable for feeding to the electrolyzer.

This secondary salt water was fed to the electrolytic cell and electrolysis was performed, and the electrolytic cell was disassembled after two weeks and the cathode surface and a surface of the ion-exchange membrane, located facing the cathode, were observed, but no attached product was observed.

Comparative Example 1

Simulated hard water having a Ca concentration of 200 mg/l was used as raw material water. The simulated hard water was prepared by filtering a liquid obtained by addition of calcium carbonate to pure water cooled to 2° C. and then dissolution of the calcium carbonate with bubbling of carbon dioxide gas all night and all day. The pH of the simulated hard water was 6.6. This water was penetrated into a cation-exchange resin (Amberlite IR120B manufactured by ORGANO CORPORATION) under room temperature, to obtain purified water. The pH of the purified water was 8.6. Therein was dissolved Nakuru N (manufactured by Naikai Salt Industries Co., Ltd.) as raw salt at 280 g/l, to generate salt water (primary salt water). The pH of this primary salt water was 8.4.

After the primary salt water was left to still stand, the supernatant was collected in a glass beaker and visually observed, and also irradiated with laser light (wavelength: 630 to 680 nm) by use of a laser irradiation apparatus (manufactured by Limate Corporation) for observation of scattering light in a dark room, and thus a light path in a liquid could be clearly seen by scattering light generated due to a suspended solid in the liquid and primary salt water slightly clouded even in visual observation was obtained. This primary salt water had a turbidity of 11 mg/l and a Ca concentration of 180 mg/l. This primary salt water was chelated as it was (CR-11 Na-type SV4.2h-1, manufactured by Mitsubishi Chemical Corporation), and thus secondary salt water slightly clouded as in the primary salt water was obtained. This secondary salt water had turbidity of 7 mg/l and a Ca concentration of 200 μg/l. After hydrochloric acid was added to this secondary salt water and shaken, the Ca concentration was measured, and thus the Ca concentration was 18 mg/l and the secondary salt water contained a large amount of Ca.

This secondary salt water was fed to the electrolytic cell and electrolysis was performed, the electrolytic cell was disassembled after 2 hours and the cathode surface and a surface of the ion-exchange membrane, located facing the cathode, were observed, and a white attached product estimated to be calcium hydroxide was observed. The cell voltage was increased by 0.4 V during electrolysis for 2 hours.

Example 2

Simulated hard water having a Ca concentration of 200 mg/l was used as raw material water. The simulated hard water was prepared by filtering a liquid obtained by addition of calcium carbonate to pure water cooled to 2° C. and then dissolution of the calcium carbonate with bubbling of carbon dioxide gas all night and all day. The pH of the simulated hard water was 6.6. This water was penetrated into a cation-exchange resin (Amberlite IR120B manufactured by ORGANO CORPORATION) under room temperature, to obtain purified water. The pH of the purified water was 8.6. Therein was dissolved Nakuru N (manufactured by Naikai Salt Industries Co., Ltd.) as raw salt at 280 g/l, to generate salt water (primary salt water). The pH of the primary salt water was 8.4.

After the primary salt water was left to still stand, the supernatant was collected in a glass beaker and visually observed, and also irradiated with laser light (wavelength: 630 to 680 nm) by use of a laser irradiation apparatus (manufactured by Limate Corporation) for observation of scattering light in a dark room, and thus a light path in a liquid could be clearly seen and primary salt water slightly clouded even in visual observation was obtained. This primary salt water had a turbidity of 11 mg/l and a Ca concentration of 180 mg/l. Hydrochloric acid was added to this primary salt water, to adjust the pH to 6.0. The primary salt water after addition of hydrochloric acid was not clouded (turbidity 4 mg/l) and was also significantly fine in track of laser light in a liquid, and thus this was chelated to obtain secondary salt water not clouded. This secondary salt water had a turbidity of 0 mg/l and a Ca concentration of 11 μg/l, and secondary salt water suitable for feeding to the electrolyzer was obtained.

This secondary salt water was fed to the electrolytic cell and electrolysis was performed, and the electrolytic cell was disassembled after two weeks and the cathode surface and a surface of the ion-exchange membrane, located facing the cathode, were observed, but no attached product was observed.

DESCRIPTION OF SYMBOLS 1 ion-exchange membrane
2 anode chamber
3 cathode chamber
4 secondary salt water
5 purified water
6 anolyte
7 chlorine gas
8 aqueous sodium hydroxide solution
9 hydrogen gas
10 electrolyzer
12 sodium hypochlorite solution
14 anode
15 cathode
16 pump
17 cooling apparatus
18 reaction tank
A raw material water
B cation-exchange resin
C salt dissolution tank
D raw salt
E primary salt water
F chelate tank

The invention claimed is:

1. A production method of a sodium hypochlorite solution for producing a sodium hypochlorite solution on-site in the vicinity of a physical plant where a sodium hypochlorite solution is used, comprising:
in production of a sodium hypochlorite solution by feeding secondary salt water as an aqueous sodium chloride solution, in an electrolyzer comparted into an anode chamber and a cathode chamber with an ion-exchange membrane, to the anode chamber and, after electrolysis, introducing an anolyte and generated chlorine gas in the anode chamber and an aqueous sodium hydroxide solution generated in the cathode chamber into a reaction tank, to allow the anolyte, the chlorine gas, and the generated aqueous sodium hydroxide solution, as a catholyte, to react in the reaction tank,
a cation exchange step of generating purified water by treating raw material water with a cation-exchange resin;
a primary salt water generation step of generating primary salt water by dissolving raw salt containing sodium chloride as a main component in the purified water;
an examination step of performing an examination for confirming the presence or absence of a precipitate or suspended solid in the primary salt water; and
a chelating step of performing chelating in the case of no precipitate or suspended solid contained in the primary salt water, or performing chelating after addition of an acid component for dissolution of the precipitate or suspended solid in the case of the precipitate or suspended solid contained in the primary salt water, to generate the secondary salt water.

2. The production method of a sodium hypochlorite solution according to claim 1, wherein a water softener is used in the cation exchange step.

3. The production method of a sodium hypochlorite solution according to claim 1, wherein a bilayer membrane configured from a sulfonic acid layer and a carboxylic acid layer is used as the ion-exchange membrane.

4. The production method of a sodium hypochlorite solution according to claim 1, wherein hydrochloric acid is used as the acid component in the chelating step.

5. The production method of a sodium hypochlorite solution according to claim 1, wherein air containing carbon dioxide is used as the acid component in the chelating step.

6. The production method of a sodium hypochlorite solution according to claim 1, wherein one having a hardness of 10 to 500 mg/l is used as the raw material water.

7. The production method of a sodium hypochlorite solution according to claim 1, wherein any of visual observation, a laser light scattering method and SS concentration measurement is used as an examination means in the examination step.

8. A production apparatus of a sodium hypochlorite solution, comprising an electrolyzer comparted into an anode chamber and a cathode chamber with an ion-exchange membrane, to which secondary salt water as an aqueous sodium chloride solution is to be fed, and a reaction tank into which products in the anode chamber and the cathode chamber after electrolysis are to be introduced, the apparatus being disposed in the vicinity of a physical plant where a sodium hypochlorite solution is used, and producing a sodium hypochlorite solution on-site by reaction in the reaction tank, characterized in that the apparatus comprises a salt water production unit comprising:

- a cation exchange treatment section for providing purified water by treating raw material water with a cation-exchange resin;
- a primary salt water generation section for generating primary salt water by dissolving raw salt containing sodium chloride as a main component in the purified water;
- a chelating section for performing chelating of the primary salt water; and
- an examination section for performing an examination to confirm the presence or absence of a precipitate or suspended solid in the primary salt water between the primary salt water generation section and the chelating section.

9. The production apparatus of a sodium hypochlorite solution according to claim 8, wherein the examination section comprises a laser light scattering measurement apparatus or a SS concentration measurement apparatus.

10. The production apparatus of a sodium hypochlorite solution according to claim 8, further comprising an addition section for adding an acid component to the primary salt water between the primary salt water generation section and the chelating section.

11. The production apparatus of a sodium hypochlorite solution according to claim 8, wherein the cation exchange treatment section comprises a water softener.

12. The production apparatus of a sodium hypochlorite solution according to claim 8, wherein the ion-exchange membrane is a bilayer membrane configured from a sulfonic acid layer and a carboxylic acid layer.

* * * * *